United States Patent [19]

Springer et al.

[11] 4,191,941
[45] Mar. 4, 1980

[54] SWITCH MATRIX FOR DATA TRANSFERS

[75] Inventors: Joseph F. Springer, Philadelphia, Pa.; Donald H. Kaplan, Cherry Hill, N.J.

[73] Assignee: RCA Corporation, New York, N.Y.

[21] Appl. No.: 892,905

[22] Filed: Apr. 3, 1978

[51] Int. Cl.² .............................................. H04Q 3/00
[52] U.S. Cl. ......................... 340/166 R; 179/18 EA; 340/147 C
[58] Field of Search ........... 340/166 R, 147 C, 147 R; 179/18 AB, 18 EA, 18 F, 18 FC, 18 FH, 18 GB

[56] References Cited

U.S. PATENT DOCUMENTS

| | | | |
|---|---|---|---|
| 3,859,470 | 1/1975 | Dittrich et al. | 179/18 EA |
| 3,866,178 | 2/1975 | Muller et al. | 340/166 R |
| 3,916,124 | 10/1975 | Joel, Jr. | 179/18 EA |
| 3,916,380 | 10/1975 | Fletcher et al. | 340/147 R |
| 4,034,159 | 7/1977 | Buron | 179/18 EA |
| 4,081,612 | 3/1978 | Hafner | 179/18 EA |

Primary Examiner—Donald J. Yusko
Attorney, Agent, or Firm—Samuel Cohen; Carl V. Olson

[57] ABSTRACT

A switch matrix for connecting any one of a large number of communications lines, transmitting a message header, with any other non-busy one of the lines. A plurality of connection links are provided. A message header identifies a transmitting line carrying a request-to-send signal, and the address of a desired receiving line. Means responsive to a received header determines the availability of an unconnected link and the not-busy condition of the desired receiving line, and connects a selected link from the transmitting line to the desired receiving line, whereby to permit the transfer of information. A link-activity checker operates automatically to disconnect a link when transmission of data through the link ceases.

4 Claims, 8 Drawing Figures

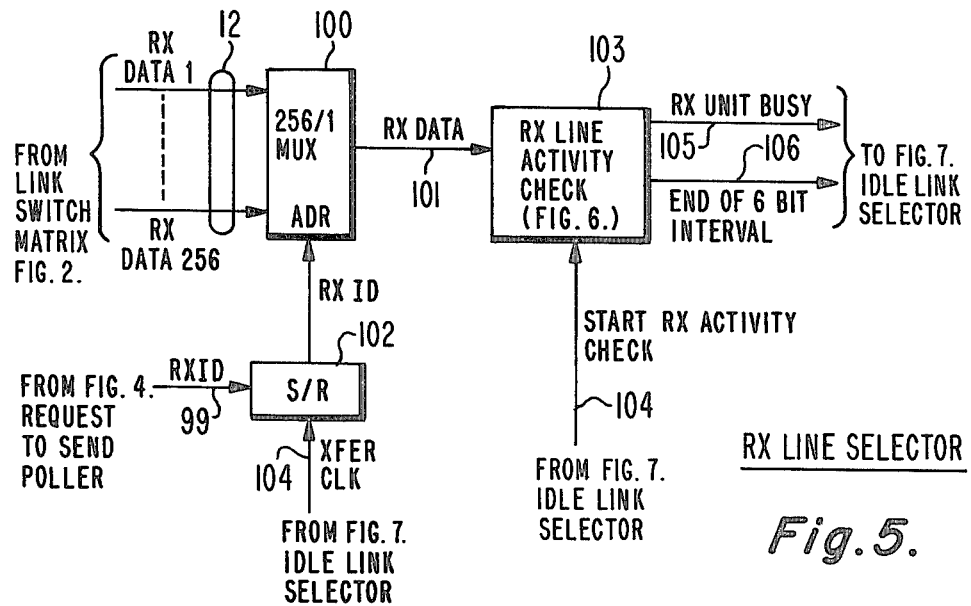
Fig.5. RX LINE SELECTOR
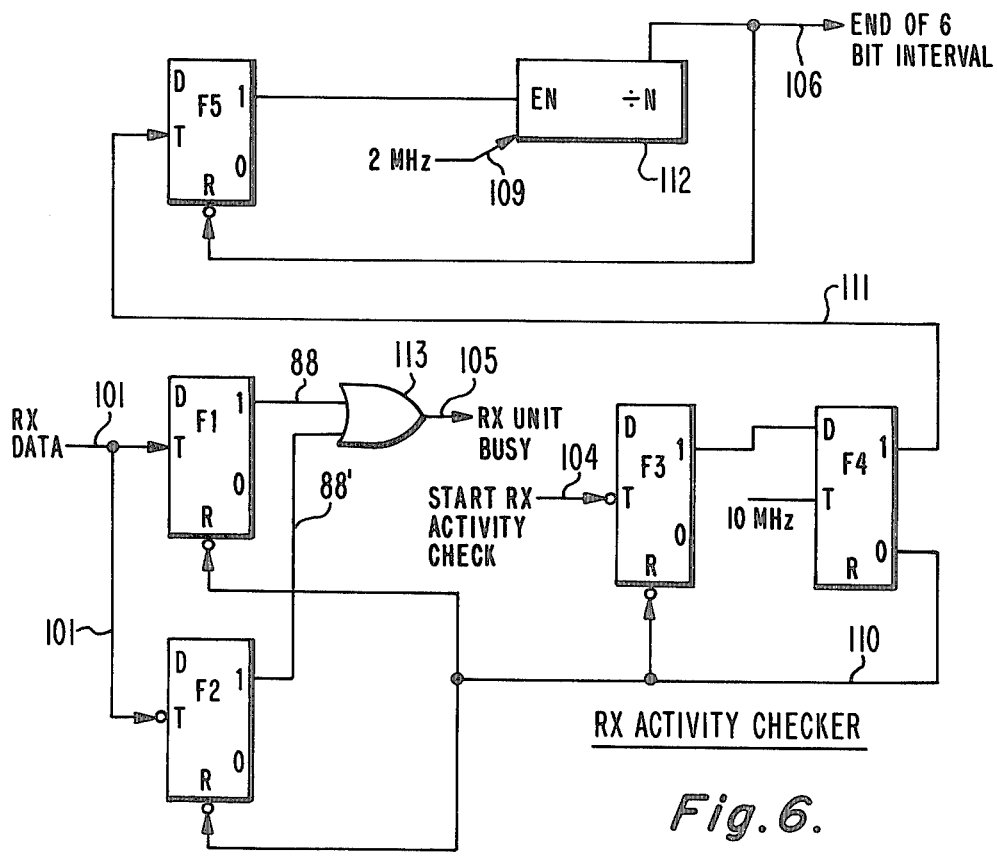
Fig.6. RX ACTIVITY CHECKER

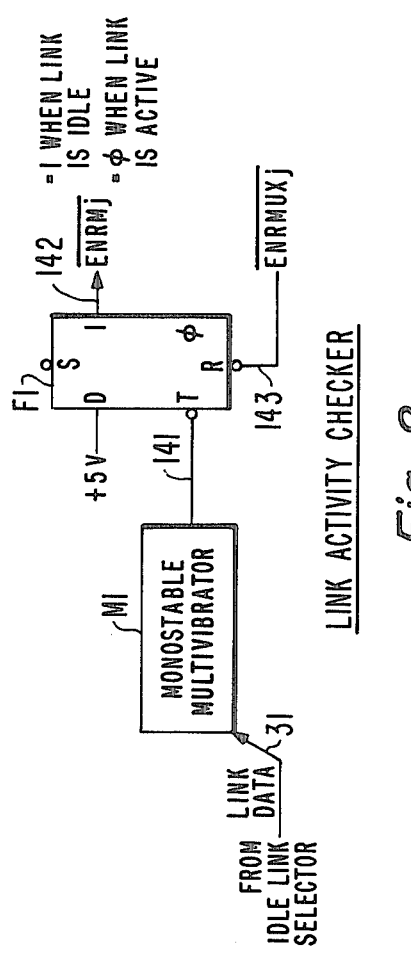

SWITCH MATRIX FOR DATA TRANSFERS

The Government has rights in this invention pursuant to Contract No. MDA904-76-C-0337 awarded by Department of the Army.

This invention relates to switch matrixes of the type differing from the crossbar type in having a plurality of transmission links which are connected as needed between transmitting lines and receiving lines. The invention is useful for connecting any one of a large number of computers to any other non-busy one of the computers for the transfer of digital information.

According to an example of the invention, a switch matrix includes means responsive to a message header to connect an available one of a plurality of connection links from a transmitting line supplying the header to a desired receiving line for the transfer of information.

In the drawing:

FIG. 5 is a detailed diagram of a receiving line activity scanner included in FIG. 1;

FIG. 6 is a detailed diagram of a part of the receiving line activity scanner included in FIG. 5;

FIG. 8 is a detailed diagram of a link activity checker included in FIG. 7.

Figure 1:
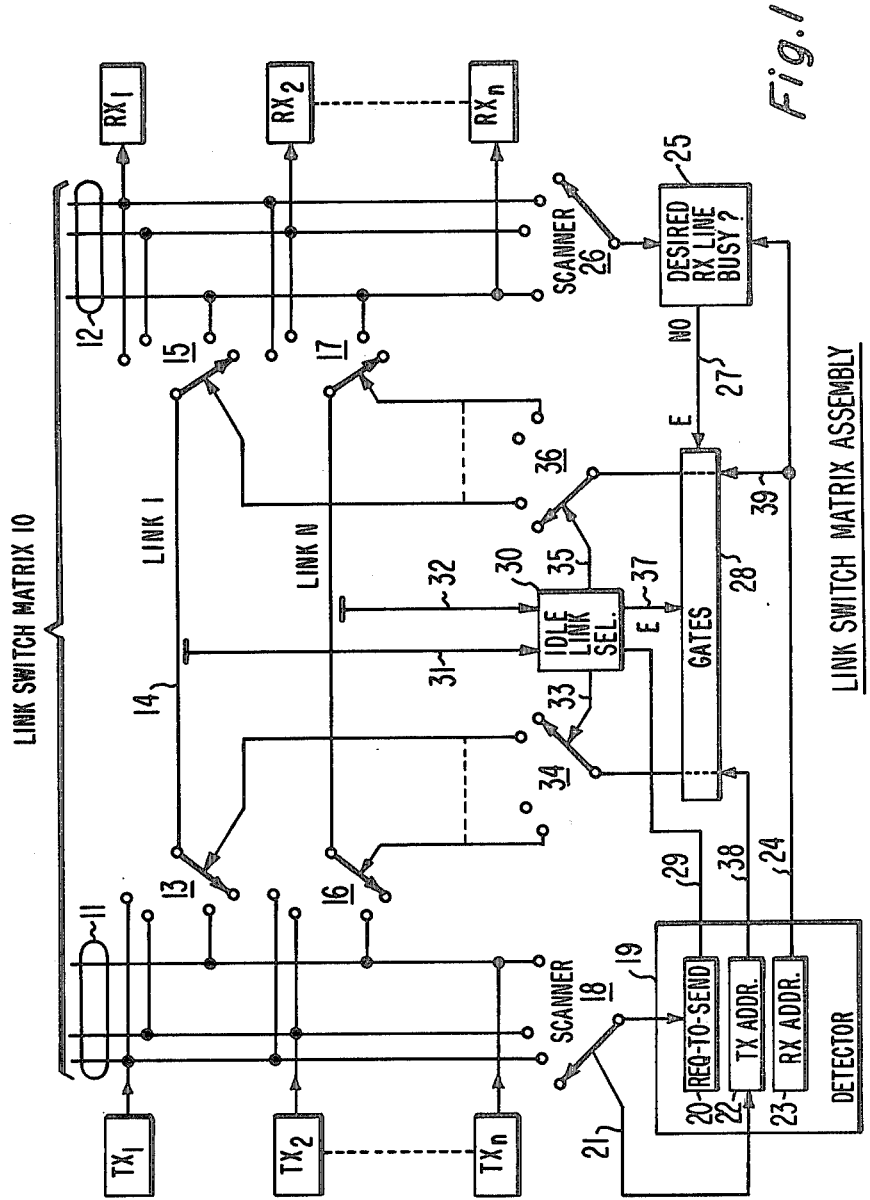
FIG. 1 is a system diagram of a switch matrix constructed according to the teachings of the invention.

Reference is now made to FIG. 1 for a description of the switching system of the invention whereby any one of a large number, such as 256, transmitting units $TX_1$, $TX_2$ and $TX_n$ may be connected through any one of a plurality, such as 36, of links to any one of a large number, such as 256, of receiving units $RX_1$, $RX_2$ and $RX_n$. The transmitting units are connected to individual conductors of a transmitting bus 11, and the receiving units are connected with individual conductors of a receiving bus 12. Each conductor in transmitting bus 11 is connected to a respective contact of a switch 13 by which any selected one of the transmitting units may be connected to one end of a first line 14. Similarly, the individual receiving units are connected through individual conductors in the receiving bus 12 to contacts of a switch 15 by which the first link 14 may be connected at its other end to any selected one of the receiving units. In a similar manner, any one of the transmitting units may be connected through a switch 16, a link N and a switch 17 to any desired one of the receiving units. The number of pairs of transmitting and receiving units which may simultaneously be connected is equal to the number of links which are included in the system. The link switch matrix 10 shown is a type having fewer links than would be needed simultaneously to connect all possible pairs of transmitting and receiving units, and in this way it differs from a cross bar switch matrix having means for simultaneously connecting all pairs of transmitting and receiving units.

The conductors of the transmitting bus 11 are cyclically scanned by a scanner 18 for connection to a detector 19 including means 20 for detecting the presence of a request-to-send signal on any one of the transmitting conductors of bus 11. Detection of a request-to-send signal on one of the conductors results in the transfer through path 21 of a coded transmitter address to TX address register 22 which, by way of the position of scanner 18, identifies the particular conductor in bus 11 and the particular corresponding transmitting unit which is actively requesting to send a message to a specified receiving unit. When the detector 19 detects a request-to-send signal from a transmitting line, the detector also detects the accompanying address of the receiving unit to which the message is to be sent. The address is stored in an RX address register 23 and applied over path 24 to a comparison circuit 25. The comparison circuit also receives inputs from the conductors of the receiving bus 12 from a scanner 26 by which the comparator 25 is informed regarding the busy or the idle conditions of all of the receiving units. If the desired receiving unit address applied to comparator 25 over path 24 is found to identify a receiving unit which is not busy, a "no" output is provided over line 27 as an enabling signal E to gates 28.

An idle link selector 30 enables the selector to sense over paths 31 and 32, the busy or idle conditions of the plurality of links represented by links 1 and N. An enabling signal over line 29 from the request-to-send unit 20 is sent to idle link selector 30 to enable selection of a not-busy link. Link selection signals are applied over path 33 to link selector switch 34, and over path 35 to link selector switch 36. Having found and selected an idle link, the selector unit 30 supplies an enabling signal E over path 37 to gates 28. Since the system is link limited, link selection is performed before receiver selection.

The description of the system and its operation has proceeded to the point where an idle link has been selected, gates 28 are enabled by the simultaneous presence of two enabling signals E from the idle links selector 30, and the receiving line comparator 25. When the gates 28 are thus enabled, a transmitting address from TX address register 22 is applied over path 38, through gates 28, through switch 34 and to the switch 13 at one end of the link 1 (assuming that link 1 was idle and has been selected by selector 30). The transmitting address is applied as a switch-operating signal to the switch 13 to cause the receiving end of link 1 to be connected with the particular transmitting unit which was detected as supplying a request-to-send signal. At the same time, the desired receiving unit address from RX address register 23 is applied over path 24, 39, through gates 28 and through switch 36 to the switch 15 at the other end of link 1. The address thus supplied to switch 15, causes the switch to connect the other end of link 1 to the receiving unit which the transmitting unit indicated was the one with which it desired to be connected for the transmission of a message. The system is now in the condition in which one of the transmitting units $TX_1$ through $TX_n$ is connected through link 1 to a desired one of the receiving units $RX_1$ through $RX_n$ for the transmission of data. The connection for the transmission of data remains until the transmission of data ceases, at which time the absence, for a predetermined minimum time, of data on the link 1 is detected by idle link selector 30, and the selector 30 acts through switches 34, 36, 13 and 15 to disconnect link 1 from the transmitting and receiving units.

Figure 2:
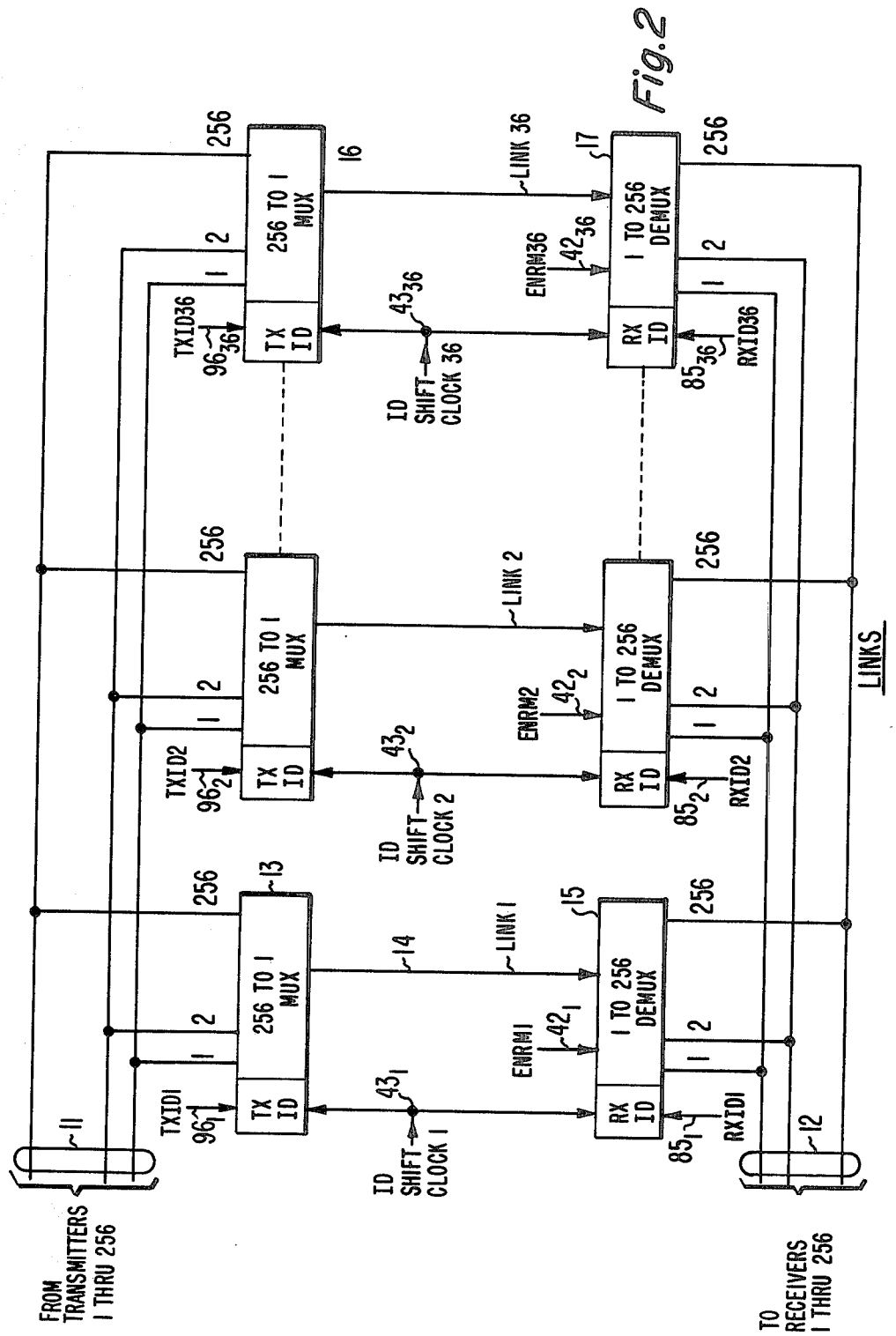
FIG. 2 is a detailed diagram of links useful in the system of FIG. 1.

Reference is now made to FIG. 2 for a description of a link switch matrix suitable for employment as the matrix 10 in the system shown in FIG. 1. Link 1 is shown in FIG. 2 to be connectable at one end through a switch 13 to any one of 256 conductors connected over bus 11 to respective transmitting units. The link 1 is shown to be connected at its other end through a switch 15 to any selected one of 256 conductors of bus 12 connected to a respective 256 receiving units. The switch 13 in FIG. 1 is implemented in FIG. 2 in the form of a multiplexer unit capable of connecting any one of 256 input lines, as determined by an 8-bit address $96_1$ identified as TX ID 1 applied to the address storage unit TX ID associated with multiplexer 13, to one end of link 1. The switch 15 at the other end of link 1 is implemented in form of a demultiplexer which connects the other end of the link to any one of 256 output lines, in accordance with an 8-bit address $85_1$ identified as RX ID 1 applied to the address storage unit RX ID associated with demultiplexer 15. The input end of link 1 may be connected via multiplexer 13 to any one of the 256 lines of bus 11, and the output end of link 1 may be connected via demultiplexer 15 to any one of the 256 lines of bus 12. A connection is made between any one of the 256 lines of bus 11 and a link 1 after signal $43_1$, also known as ID SHIFT CLOCK 1, has loaded the 8-bit address $96_1$, also known as TX ID 1, into the address register of multiplex unit 13. The connection between link 1 and the selected line of bus 12 is accomplished by the application of signal $43_1$, also known as ID SHIFT CLOCK 1, and the 8-bit address $85_1$ to the address register RX ID of demultiplexer unit 15 and the application of demultiplexer enabling signal $42_1$ also known as ENRM1. ID SHIFT CLOCK 1, signal $43_1$, loads the 8-bit source address $96_1$ and 8-bit destination address $85_1$ simultaneously. Signal $85_1$ is the 8-bit address corresponding to the line selected in bus 12. After the address loadings are completed for multiplexer 13 and demultiplexer 15, demultiplexer 15 is enabled by the application of signal $42_1$, ENRM1. It is at this instant that the selected line of bus 11 and the selected line of bus 12 are connected.

The link switch matrix of FIG. 2 also includes a link 2, which is exactly the same as link 1, and additional links 3 through 36, of which link 36 is shown in the drawing as being connected through multiplexer 16 to the transmitting unit lines 11 and being connected through demultiplexer 17 to the receiving unit lines 12. The individual multiplexers of links 2 and 36 receive individual 8-bit source address input signals $96_2$ and $96_{36}$ respectively and individual address shift clock signals $43_2$ and $43_{36}$, respectively. Similarly, the demultiplexer units of links 2 and 36 receive 8-bit destination address input signals $85_2$ and $85_{36}$ respectively, and individual demultiplexer enabling signals $42_2$ and $42_{36}$ respectively. The ID SHIFT CLOCK associated with a given link is used simultaneous by the multiplexer/demultiplexer connected to that link. It is thus apparent that any one of the 36 links may be connected between any one of the 256 transmitter lines and any one of the 256 receiving lines. The 36 links can provide connections between up to 36 transmitter units and 36 receiver units.

Figure 3:
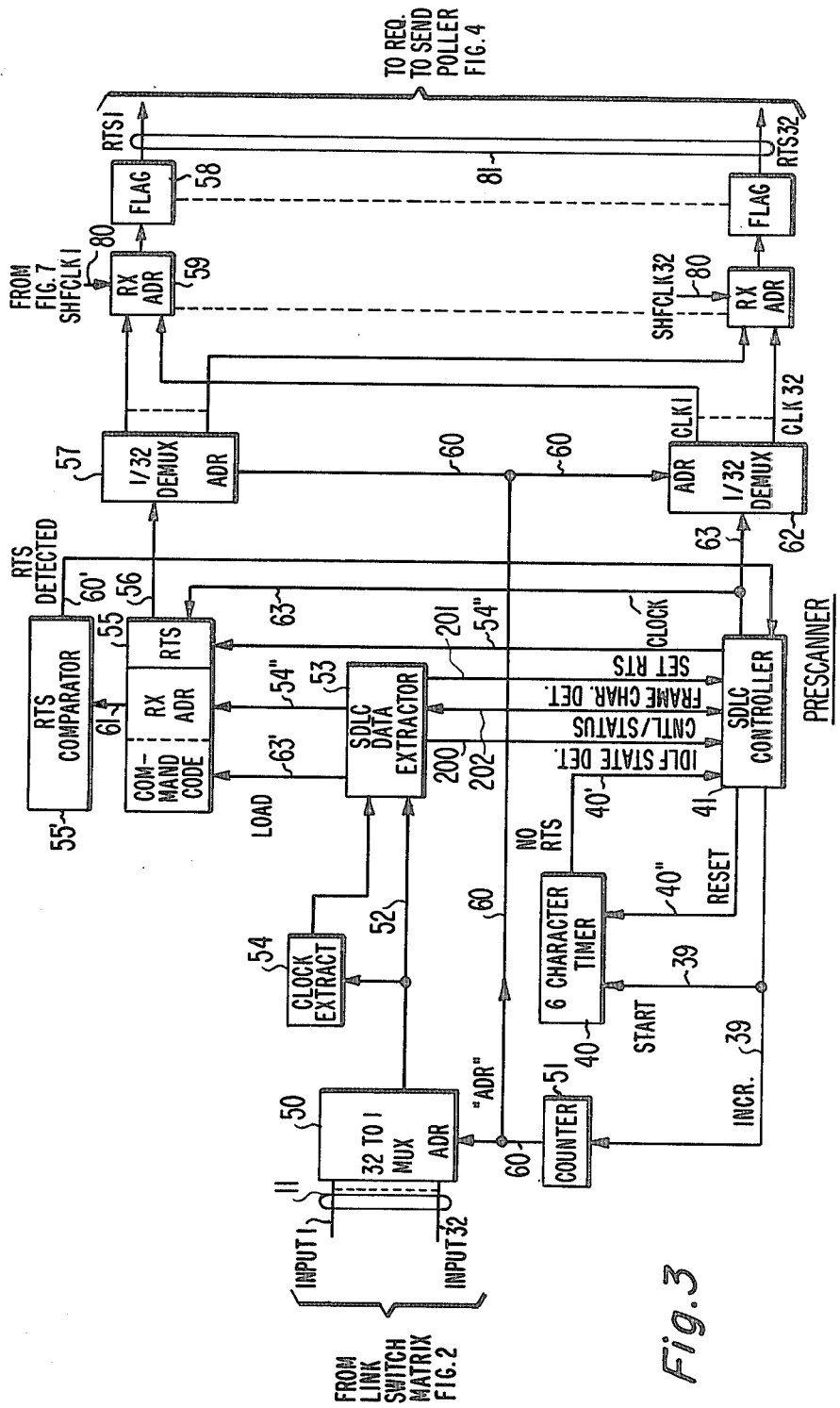
FIG. 3 is a detailed diagram of part of a scanner included in FIG. 1.

The scanner 18 in FIG. 1 includes a prescanner shown in FIG. 3. The prescanner, which is used to detect a request for connection from a transmitting unit, includes a 32-to-1 multiplexer 50 receptive to sequential addresses from counter 51 for sequentially connecting message signals from 32 transmitting lines of bus 11 over a path 52 to a Synchronous Data Link Control (SDLC) data extractor 53 which is clocked by a clock signal extracted from the message signal by clock extractor 54. SDLC is a well-defined, industry-recognized data transmission protocol defining data transmission formats. This and similar national transmission standards, such as American National Standard for Advanced Data Communications Procedures (ADCCP), provide data transmission definitions necessary and sufficient to the operation of the herein-described switch control. Though operation is not limited to SDLC, the following paragraphs use SDLC as the subject communication protocol.

The SDLC data extractor 53 is a collection of circuits which extracts the data from an SDLC formatted message. The SDLC data extractor 53 detects the starting and ending of a message by recognition of the SDLC framing characters, and reconstructs the data, in accordance with SDLC protocol, between the starting and ending framing characters. Also in accordance with the SDLC protocol, it delineates the RX Address and Command fields and checks the validity of the message by using the received CRC characters. The SDLC data extractor 53 provides status and control signals 202 consisting of a data available signal derived as a result of receiving the message and receiver address available signal to the SDLC controller 41 which, in turn, produces various control signals such as a clock signal at 63 and a set RTS signal at 54'.

The SDLC data extractor 53 also detects SDLC idle or framing characters and upon detection provides SDLC controller 41 with idle state detection signal on line 200 or frame character signal on line 201.

If the SDLC data extractor 53 output to the SDLC controller is the idle state detection signal on line 200, then the one of the 32 lines at input 11 as specified by the output 60 of counter 51 is in the idle state and therefore, is not requesting a connection. Accordingly, counter 51 is advanced one sequential address by a clock pulse 39 initiated by SDLC controller 41. The effect is to connect the next sequential input line of bus 11 to output 52 of multiplexer 50. Simultaneously, the clock pulse on line 39 activates a six character timer 40 to time the reception of the request for connection message which is composed of six characters: frame, receiver address, request-to-send command (RTS), two CRC characters and frame. After a time interval of six character durations, if the request for connection message indicator is not received on line 60' by the SDLC controller 41 from the RTS comparator 55', then the "No RTS" signal is generated on line 40' by the expiration of six character timer 40 and received by SDLC controller 41. The SDLC controller 41 again generates counter increment signal on line 39 as explained above.

The SDLC controller 41 also counts framing character indicators generated on line 201 by SDLC data extractor 53. If three successive framing characters occur within no intervening non-framing characters, then the transmitting unit is "holding" the connection. Counter 51 is incremented as previously explained.

Reception of a framing character followed by a non-framing character causes SDLC data extractor 53 in conjunction with SDLC controller 41 to generate a signal on line 63' to load the two characters following the framing character into shift register 55. The characters according to SDLC protocol are an eight bit command code and an eight bit destination address sequentially transferred on line 54". With these conditions, the SDLC controller 41 generates a reset signal at 40" for the six character timer 40 which turns timer 40 off. The command code is applied over bus 61 to RTS (request-to-send) comparator 55'. If the command code is the RTS code, then the comparator 55' generates a signal on line 60' to SDLC controller 41. If not, SDLC controller 41 generates a clock signal on line 49 to counter 51 allowing examination of the next sequential input of bus 11.

If the signal on line 60' indicates the reception of a request for connection message, the RTS flag 54' is loaded into register 55 by the SDLC controller 41. Whereupon, the RTS flag and receiver address is shifted out of register 55 along signal path 56 by shift clock at 63 to a 1-to-32 demultiplexer 57. The demultiplexer 57 uses the address received over line 60 to route the RX address and RTS flag signal to one of the thirty-two RX address registers 59 and associated RTS flat register 58. The address on line 60 is simultaneously applied to 1-to-32 demultiplexer 62 which steers the clock on line 63 to the proper one of registers 59 and registers 58 for the loading of the RTS flag and receiving unit address from demultiplexer 57.

FIG. 3 shows paths from 32 transmitting lines 11 to a respective 32 flag and RX address shift registers 58, 59. If, as according to the present example, there are 256 transmitting lines 11, parallel paths are similarly provided for an additional 224 lines by adding seven more prescanners exactly of the type shown in FIG. 3. The output of the eight prescanners then includes 256 registers 58, 59, each for a request-to-send flag and a receiving address, and each corresponding with a respective one of the 256 transmitting units.

Figure 4:
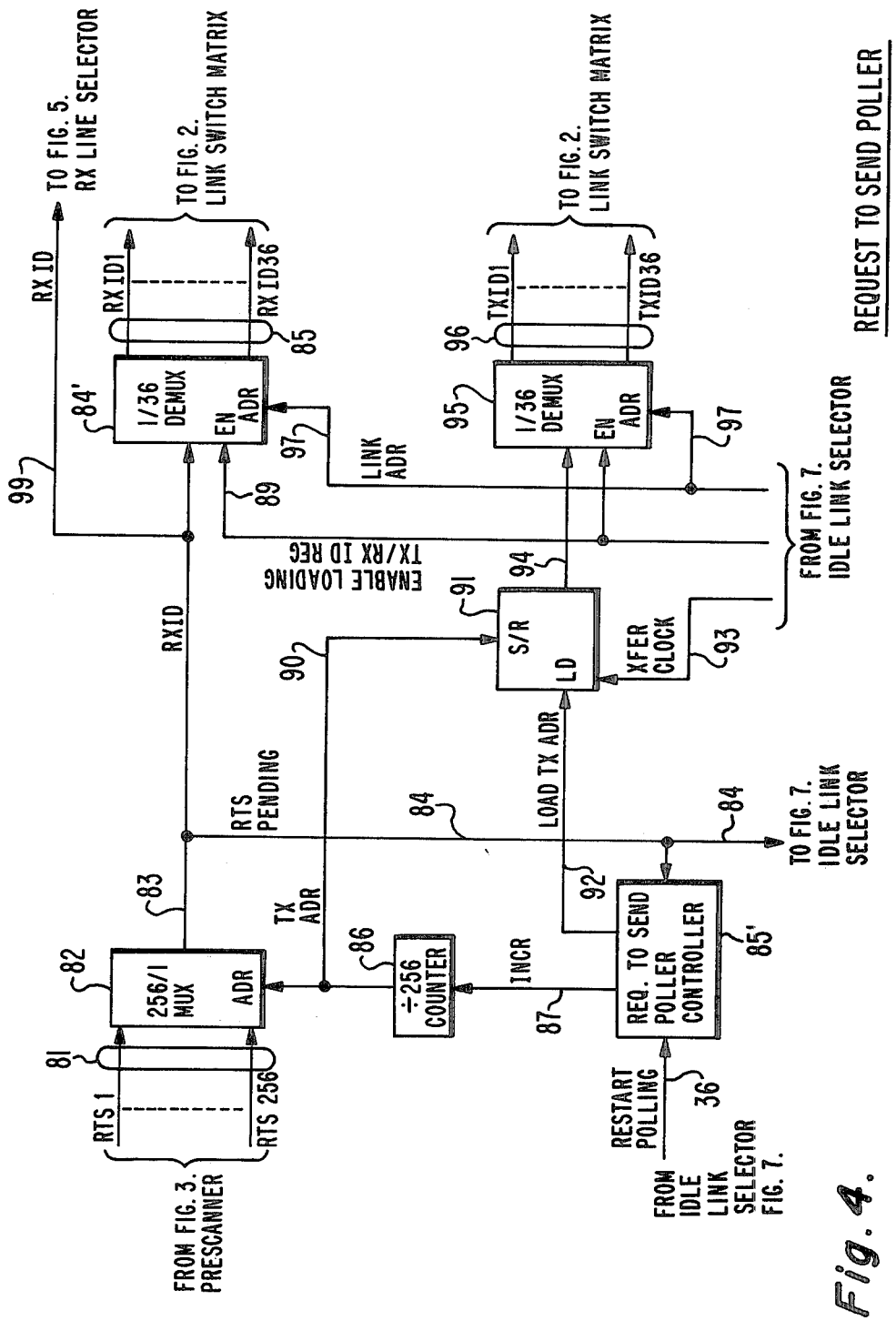
FIG. 4 is a detailed diagram of the remainder of the scanner included in FIG. 1.

The scanner 18 in FIG. 1 includes the prescanner of FIG. 3 which has been described, and also includes a request-to-send poller shown in FIG. 4. The 256 outputs 81 of the 8 sets of 32 flag and address registers in FIG. 3 are connected to multiplexer 82 in FIG. 4, and therefrom over a line 83 to a demultiplexer 84' having 36 output lines 85. The multiplexer 82 is supplied with sequential addresses 1 through 256 from a counter 86, as the result of which the 256 lines carrying information about 256 transmitting units are sequentially connected through the multiplexer 82 to the output line 83. The first information bit appearing on line 83 is a request-to-send flag bit from a transmitting unit. This flag bit is applied over line 84 to a request-to-send poller controller 85'. The controller 85', upon receipt of an enabled request-to-send bit, interrupts the sending of incrementing pulses over path 87 to the counter 86. The sequential polling of connection information from the 256 transmitting lines connected to multiplex 82 is thus halted. The same enabling signal at 84 also at this time starts the selection of an idle link by the link selector 30 of FIG. 7.

Figure 7:
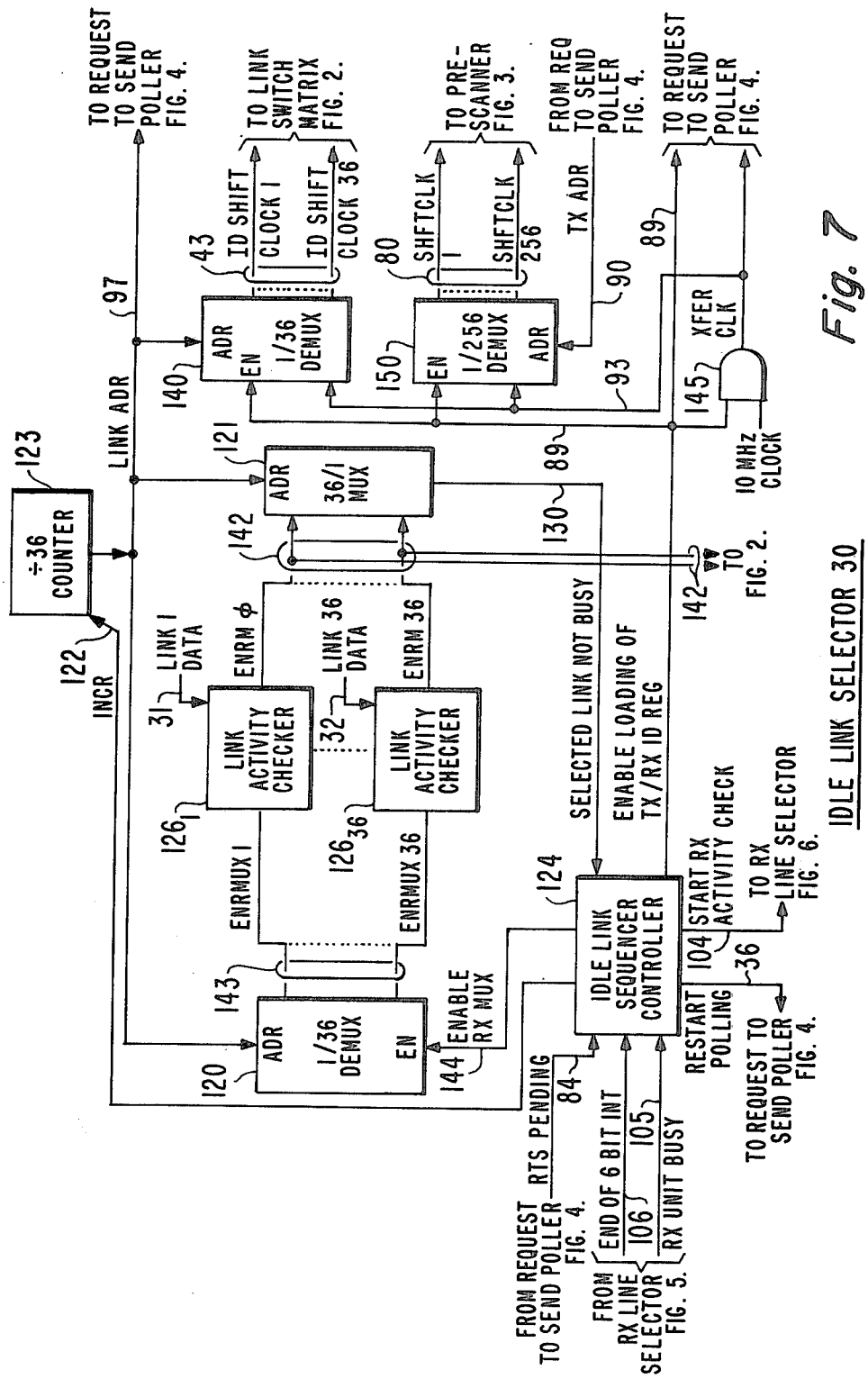
FIG. 7 is a detailed diagram of the idle link selector included in FIG. 1.

When an idle link is selected by the idle link selector shown in FIG. 7, the link address on line 97 and an enable signal on line 89 are both returned to the 1 to 36 demultiplexer units 84' and 95. The idle link selector also transmits a shift clock on line 93 to shift register 91. The receiving unit address, contained in register 59 shown in FIG. 3 corresponding to the transmitting unit being serviced and also indicated by TX ADR on line 90, is transferred by one of the shift clock signals of bus 80 in FIG. 7, as selected by TX ADR on line 90, to shift register 102 of RX line selector shown in FIG. 5. The selected shift clock on one line of bus 80 corresponds to the transmitting unit requesting service and thus to the register 59 (FIG. 3) containing the receiving unit address. Referring to FIG. 4, the particular receiving unit address is applied simultaneously through the demultiplexer 84', enabled by a signal on line 89, to one of the 36 output lines of bus 85 selected by the link address on line 97. Each output line of bus 85 is connected of a corresponding receiver unit address register (labeled RX ID) of the 1 to 256 demultiplexer units shown in FIG. 2. The receiver unit address at 85 is transferred to the selected receiver unit address register (FIG. 2) by shift clock on line 43 (FIG. 7) which is also selected by a link address on line 97.

Synchronous with the transfer of the receiver address on a line 85 is the transfer of the transmitting unit address on a line 96 to the transmitting unit address register of the 256 to 1 multiplexer unit (FIG. 2) of the selected link. The selected transmitting address on line 96 is the TX ADR on line 90 previously loaded in shift register 91 (FIG. 4) by a load pulse on line 92, and shifted out of register 91 by a shift clock on line 93 as the receiver address on line 81 (FIG. 3) was shifted out of the selected register 59.

It is thus far apparent that the request-to-send poller of FIG. 4 has 36 receiving address outputs on bus 85 which are connected to the 36 receiving unit address lines $85_1$ through $85_{36}$ for the 36 links in FIG. 2. Also, the poller of FIG. 4 has 36 transmitting unit address lines $96_1$ through $96_{36}$ for the 36 links shown in FIG. 2. The particular one of the receiving address lines, and the particular one of the transmitting address lines, over which receiving and transmitting addresses are sent is determined by the link number which is applied as an address over line 97 from FIG. 7 to the address inputs of demultiplexers 84' and 95 in FIG. 4. The particular link address used is determined by the sequencer of FIG. 7 after taking account of which links are busy and which are available for use. The actual transferring of a transmitting unit address, and a receiving unit address, to the link switch matrix of FIG. 2 is performed only after it has been determined that an idle link has been identified and selected and that the desired receiving line is not busy.

Reference is now made to FIG. 5 for a description of a receiving line selector for use as the scanner 26 and the comparator 25 in FIG. 1. A multiplexer 100 has 256 input lines 12 connected with the 256 conductors of the receiving units bus 12 shown in FIG. 1, and has one output line 101 for a particular one of the receiving unit lines determined by the address applied to the multiplexer by a shift register 102 which receives a receiving unit address over line 99 from the output 83 of the multiplexer 82 in FIG. 4. The 8-bit receiving unit address is shifted serially into the shift register 102 by a shift signal on line 104 from the link selector shown in FIG. 7. The multiplexer 100 connects the receiving unit line with which a transmitting unit wishes to communicate to a receiving line activity checker 103. The data on the selected line of the receiving bus 12 is applied to the receiving line activity checker 103 for a determination of whether or not the desired receiving unit is busy. The checker 103 begins its check when it receives a start signal over line 104 from the link selector of FIG. 7. The start signal on line 104 is generated by the link selector of FIG. 7 after an idle link has been selected. The checker 103 produces a busy or not busy signal on output line 105 connected to the link selector of FIG. 7, and produces a signal on line 106 indicating the end of the 6-bit interval which is also applied to the link selector of FIG. 7. The combination of both signals are used by the link selector to ascertain if the receiving unit is idle or busy.

The receiving line activity checker 103 in FIG. 5 is shown in greater detail in FIG. 6. A start signal on line 104 from the idle link selector of FIG. 7 is applied to the trigger input of flip-flop F3 which starts the RX activity checker. The combination of F3 and F4 in tandem generates a 100 nanosecond pulse on line 111 and the same pulse of opposite polarity on line 110. Pulse 111 is applied to the trigger input of flip-flop F5 starting a 6-bit timer composed of F5 in conjunction with counter 112 used to count 6 pulses of the extracted data clock on line 109. Pulse 110 is applied to the reset inputs of F1, F2 and F3.

The RX data to be tested for activity is applied on line 101 to flip-flop F1 and F2 which are triggered on opposite polarities of the same trigger signal. If the receiver unit signal on line 101 has a positive or negative transition, a "1" will appear on line 88 or 88', respectively, causing line 105 to indicate that the receiver unit line is busy.

The idle receiver line 101 will have the idle character composed of 7 or more successive "1" bits. Thus, if within a 6-bit interval represented by a signal on line 106, signal on line 105 is not enabled, then the receiver unit is idle. Accordingly, signals on lines 105 and 106 are sent to the idle link sequence controller 124 of FIG. 7 where the signal on line 105 is examined during the 6-bit interval defined by signal on line 106 and the state of the receiver unit is determined.

Reference is now made to FIG. 7 for a description of an idle link selector suitable for use in the box 30 in the system of FIG. 1. The idle link selector includes 36 link activity checkers $126_1$ through $126_{36}$ each one assigned to one of the 36 links. Each activity checker 126 continuously monitors data on its respective link. In FIG. 7, the data on link 1 is represented by a signal on line 31, data on link 36 is represented by a signal on line 32. The link activity checker determines whether the link is idle or active (connected). This monitoring proceeds independently of and concurrently with, any other function heretofore discussed.

The selection of an idle link commences with the idle link sequencer controller 124 receiving a signal on line 84 from the request-to-send poller of FIG. 4. Signal 130 coming from the output of a 36 to 1 demultiplexer 121, whose inputs on lines labeled 142 are the activity states of each of the 36 links, is examined by idle link sequencer controller 124. The link sequencer controller 124 determines if the link, indicated by the link address on line 97 generated by counter 123, is busy or idle. If the link is busy, then counter 123 is incremented by clock signal on line 122 generated by controller 124. This causes the next sequential link activity checker output on a line of bus 142 to be connected through demultiplexer 121 to line 130 for examination by controller 124. The incrementing of counter 123 continues until signal 130 indicates that the link represented by the link address on line 97 is idle. Whereupon, as previously described, shift clocks on individual lines of buses 43 and 80 load the transmitter unit and receiver unit address in the address registers of the selected link as shown in FIG. 2. Simultaneously, the receiver line selector of FIG. 5 is activated by signal on line 104 to check if the receiver unit is idle. Signals on lines 105 and 106 from the receiver line selector of FIG. 5 to controller 124 in FIG. 7 indicate if the receiver unit is idle. If the receiver unit is busy, a signal on line 36 is generated to the request-to-send poller of FIG. 4 causing the signal on the line of bus 81 from the next sequential transmitter unit to be queried for a connection request.

If the receiver unit is idle, a signal on line 144 is applied by controller 124 to the 1 to 36 demultiplexer unit 120 causing the link activity checker 126 of the selected idle link to be set to the busy state. The signal on the line in bus 142 of the selected link now indicates that the selected link is busy (connected). The signal is applied over a conductor of bus 142 to the enable input 42 of the demultiplexer unit (FIG. 2) of the selected link to enable connection of the link to a receiving unit line. At this point, the connection is made between the transmitter unit requesting service and the specified receiving unit.

Signal 36 is now generated by controller 124 to request-to-send poller of FIG. 4 enabling the continuation of the polling for service requests.

The link activity checker 126 in FIG. 7 is shown in greater detail in FIG. 8 to consist of a retriggerable monostable multivibrator M1 clocked by either a positive or negative transition of link data signal on a line 31, and a flip-flop F1 triggered by the trailing edge of the monostable multivibrator output on line 141.

When the link corresponding to link data 31 is assigned, the signal on one line in bus 143 of the idle link selector of FIG. 7 resets F1 causing the signal on one line of bus 142 to change from the one state to the zero state. The zero state indicates the link is busy. Concurrently, the link is being checked for the cessation of the transmission indicated by the reception of idle characters in link data signal line 31. The link data is continuously applied to monostable multivibrator M1 (FIG. 8) set to generate an output signal on line 141 having a nine data bit duration. If a transition does not occur by the ninth bit, then the link is carrying the idle character since SDLC formatted data never contains a string of more than eight consecutive 1's. The signal on line 141 changes state, thus triggering F1 and causing a signal on line 142 to change to the "1" state thus indicating an idle link. Conversely, if the link is active, link data on line 31 has at least one transition within the 9-bit interval which inhibits the signal on line 141 from triggering F1. Thus, the flip-flop F1 remains reset indicating that the link is active.

To summarize the described operation, the transmitting lines of bus 11 (FIGS. 1, 2, and 3) are polled until a line is found which carries a request-to-transmit command code and the address of a receiving unit intended to receive data from the transmitting unit. The idle link selector 30 in FIG. 1 (FIG. 7) is now activated to find an idle or available link. The links are sequentially scanned, and when an idle link is found by a link activity checker 126 in FIG. 7, the address or number of the available link is applied over line 97 as a link address to the address inputs of demultiplexers 84' and 95 in FIG. 4. Now the address of the transmitting unit read from counter 86 of the request-to-send poller of FIG. 4 is applied over lines 90, 94 to the signal input of demultiplexer 95 in FIG. 4. The address of the desired receiving unit is applied to the signal input of the demultiplexer 84' in FIG. 4. The signal on line 89 from the idle link controller 124 of FIG. 7 now enables demultiplexers 84' and 95 to pass the RX and TX addresses through the demultiplexers. This causes the address of the desired receiving unit to be connected over a selected one of the 36 conductors of bus 85 from demultiplexer 84' to a corresponding selected idle link in FIG. 2, and causes the address of the transmitting unit to be connected over a selected one of the 36 conductors of bus 96 from demultiplexer 95 to the selected idle link in FIG. 2.

The receiving address is loaded in bit serial manner into the demultiplexer in the selected link (FIG. 2), and the transmitting address is loaded in bit serial manner into the multiplexer in the same selected link, under control of an address shift-clock pulse wave over a conductor of the bus 43 from the link selector of FIG. 7. The address shift pulse wave is supplied from a selected one of 36 output lines from demultiplexer 140 which is determined by the selected link address supplied to the address input of demultiplexer 140. The demultiplexer 140 is enabled by the enabling signal over line 89 from the link busy sequencer controller 124 in the link selector of FIG. 7. The demultiplexer 140 receives a shift pulse wave over line 94 from a gate 145 which receives a 10 MHz input, and is enabled by the enabling signal on line 89.

Finally, a determination is made as to whether the receiving unit to which communication is desired is available, and if it is not busy, as determined by the circuitry of FIG. 5, an enable signal on a line of bus 42 from the idle link selector (FIG. 7) is transmitted to the 256 to 1 demultiplexer of the selected link (FIG. 2). It is at this instant that the transmitter unit is connected to the desired receiving unit over the selected link. The connection process is completed and the scanning of transmitter units for another one requesting a connection is resumed.

What is claimed is:

1. A switch matrix for connecting any one of a large number of communications lines transmitting a message header with any other non-busy one of the lines, comprising a plurality of connection links each including a multiplexer having a plurality of inputs coupled to respective transmitting lines and a transmitting address input for connecting an addressed one of the inputs to the output of the multiplexer, and a demultiplexer having an input connected to the output of the multiplexer, a plurality of outputs coupled to respective receiving lines, and a receiving address input for connecting the input to an addressed one of the outputs, a transmitting line scanner including a message header decoder for identifying a line carrying a request-to-send signal, the address of the line, and the address of a desired receiving line, means responsive to a request-to-send signal from said decoder to select an unconnected link, said means including a link activity checker for each link to continuously monitor the passage of data through the respective link, means responsive to the address of a desired receiving line to determine the not-busy condition of the line, and means conditional on the availability of an unconnected link and the not-busy condition of the desired receiving line to transmit the address of the transmitting line and the address of the desired receiving line to the selected link, whereby to connect the transmitting and receiving lines for the transfer of information.

2. A switch matrix according to claim 1 wherein said transmitting line scanner includes a plurality of prescanners arranged in parallel, and a request-to-send poller having an input connected to the output of the prescanner.

3. A switch matrix according to claim 1 wherein said means to select an unconnected link includes a demultiplexer having outputs connected to respective link activity checkers, and includes a multiplexer having inputs connected to respective link activity checkers.

4. A switch matrix according to claim 3 wherein said means to select an unconnected link includes means coupled to said activity checker automatically to disconnect a link when transmission of data through the link ceases.

* * * * *